United States Patent Office 3,826,769
Patented July 30, 1974

3,826,769
SELF-EMULSIFIED POLYURETHANES PREPARED BY DIRECT SULFONATION OF ISOCYANATE
Robert C. Carlson, Hudson, Wis., assignor to Minnesota Mining and Manufacturing Company, St. Paul, Minn.
No Drawing. Application July 14, 1969, Ser. No. 841,570, which is a continuation-in-part of abandoned application Ser. No. 749,573, Aug. 2, 1968. Divided and this application Aug. 14, 1972, Ser. No. 280,239
Int. Cl. C08g 22/26
U.S. Cl. 260—29.2 TN
11 Claims

ABSTRACT OF THE DISCLOSURE

The disclosed polymers are useful in self-emulsified polyurethane (including polyurethane-polyurea) latices formed by reacting an aromatic isocyanate-terminated polyurethane polymer with a strong sulfonating agent and chain extending the prepolymer with water, the chain extension being preferably subsequent to or simultaneous with a neutralization step.

---

This application is a division of United States copending application Ser. No. 841,570, filed July 14, 1969, which in turn is a continuation-in-part of Ser. No. 749,573, filed Aug. 2, 1968 (now abandoned).

This invention relates to anionic polyurethane (including polyurethane-polyurea) or polyurea latices, a method of making the same, and to sulfonated aromatic polyisocyanates used in their preparation. More particularly, the invention relates to prepolymers containing sulfonic acid salt groups which, when chain extended, remain in stable aqueous emulsion without the need for separate emulsifiers, to the resulting latices and to the method for their preparation.

It has been proposed in British Pat. No. 1,078,202, published Aug. 9, 1967, to form polyurethane latices free from emulsifiers by incorporating salt-type groupings into the polymer. Such incorporation is usually accomplished in solution by reacting an isocyanate terminated prepolymer with a component which will react with two isocyanate groups and which contains a salt forming group, or by partially chain stopping the isocyanate terminated prepolymer with a monofunctional constituent which contains a salt forming group. In the first case the chemical structure of the polymer is altered, often causing changes in the ultimately-obtained physical properties which are difficult to control. The second method prevents chain extension of the portion of the prepolymer which has been chain stopped or end-blocked and thus also results in changes in physical properties in this case due to a lesser degree of polymerization. The process disclosed in this patent involves polymerization in organic solvent solution followed by transfer into an aqueous phase. Usually the organic solvent must be removed by a separate distillation operation.

British Pat. No. 1,146,890 teaches polyurethanes containing $SO_4^-$ groups, but these groups are easily split off, thus complicating the control over the physical properties of the ultimately-obtained polymer.

The present invention provides a method for producing stable latices of chain-extended isocyanate-terminated prepolymers which avoids the aforesaid difficulties. In accordance with the invention, sulfonic acid salt groups are introduced into isocyanate terminated prepolymers by simple procedures without alteration of the polymer backbone. It has been found that stable anionic polyurethane, including polyurethane-polyurea, or polyurea latices can readily be prepared by treating an aromatic polyisocyanate or an isocyanate terminated prepolymer with a strong sulfonating agent selected from sulfuric acid, sulfur trioxide, chlorosulfonic acid, and mixtures thereof, converting the sulfonic acid groups to sulfonic acid salt groups, emulsifying in water and effecting chain extension with simple polyfunctional (including difunctional) molecules, including water and polyamines.

The isocyanate-terminated prepolymers containing sulfonic acid salt groups of this invention are readily dispersed in water so that generally little or no inert solvent is required to reduce the viscosity of the prepolymer to permit dispersion into small latex particles. The invention provides stable polyurethane (including polyurethane-polyurea) or polyurea latices containing no separate dispersing agent. The polymer latices of this invention are anionic in nature and have exceptional stability over a wide pH range. They are also stable to mechanical action, to the addition of various additives, such as pigments and thickeners, and to freezing. Films formed from the latices of this invention are resistant to yellowing.

This sulfonic acid procedure has the advantage that the sulfonation is easy to carry out and can be included as part of the procedure for reacting the diisocyanate with the polyhydroxy material so that no separate kettle step is involved. Emulsification of the sulfonated prepolymers can be accomplished with little work expended.

The latices of this invention have good mechanical stability and can be easily used as the binder for latex paints. In this regard they have very good adhesion to bricks, for example, and applicators can be cleaned by washing in plain water.

These latices generally are neutral as prepared, but are stable under both acid and alkaline conditions. They can be readily thickened by the addition of conventional thickening agents. No separate emulsifying agent is used in their preparation and therefore the properties of films or coatings made from them are not compromised by the presence of such extraneous materials. Films cast from the latices are usually clear and colorless and have excellent physical properties.

The process of the invention involves the incorporation of a salt-forming group into the prepolymer without otherwise changing the structure. This permits the designing of polymers with a minimum of complication from extra urea or urethane or other groups in the polymer structure.

The reaction of phenyl isocyanate with sulfuric acid is reported by Bieber [J. Am. Chem. Soc., 75, 1405 (1953)] to give sulfanilic acid.

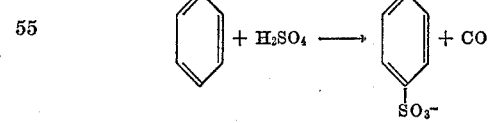

He speculated that the first reaction is the addition of the sulfuric acid to the isocyanate to give a mixed anhydride. The sulfanilic acid can then result from either intramolecular rearrangement or by intermolecular sulfonation. In either case the net effect is sulfonation of the phenyl isocyanate by the sulfuric acid. Sulfonation can also be accomplished directly by the use of oleum, sulfur trioxide, or chlorosulfonic acid, as the sulfonating agent. "Sulfur trioxide," as the term is used herein, is intended to include complexes thereof with compounds such as dioxane.

The reaction occurs in the practice of the present invention, as follows:

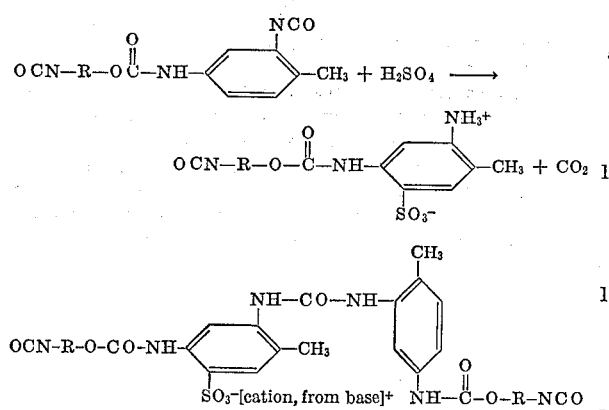

where R represents a prepolymer chain.

With oleum, sulfur trioxide or chlorosulfonic acid, direct sulfonation of a terminal, isocyanate containing benzene ring or of an internal benzene ring apparently occurs to lead ultimately to a similar sulfoated prepolymer which can be emulsified in water containing a base without the addition of any emulsifying agent. Similar reactions can be carried out with other aromatic polyisocyanates.

The reaction of sulfuric acid with prepolymers formed from toluene diisocyanate (TDI) and polyoxypropylene glycols is usually carried out by heating at 75° C., the $CO_2$ evolution being essentially complete in 5–10 minutes. Analysis of the product after cooling and neutralization indicates that two equivalents of isocyanate are consumed per mole of sulfuric acid added. The sulfonated prepolymers self-emulsify on stirring into water to produce stable latices because of the presence of sulfonic salts along the polymer chains.

Similar results are achieved by reacting a portion of the aromatic polyisocyanate with sulfuric acid, sulfur trioxide or chlorosulfonic acid and adding the sulfonated product to a prepolymer. Latices formed from such mixtures of sulfonated polyisocyanates and non-sulfonated prepolymers appear fully equivalent to those formed by direct sulfonation of the prepolymer having the same sulfonic acid salt content. Aromatic polyisocyanates having molecular weights between about 160 and 25,000, preferably 720 to 10,000, can be sulfonated, converted to sulfonic acid salts, and chain extended and self-emulsified to form latices in accordance with the invention. "Polyisocyanate," as the term is used herein, is intended to include both commercially available, relatively low molecular weight materials and higher molecular weight polyisocyanate terminated prepolymers. The lower molecular weight sulfonated prepolymers are preferably blended with higher molecular weight prepolymers in order to form rubbery polymers. High molecular weight prepolymers may require dilution with volatile solvents in order to facilitate emulsification.

The preferred isocyanate terminated prepolymers used in this invention are prepared by reacting a hydroxyl-terminated material with a polyisocyanate. The hydroxyl-terminated material is usually a polyalkylene ether glycol, and the polyisocyanate is usually an aromatic diisocyanate. The ratio of NCO to OH groups in the reactants is preferably between 1.5:1 and 2.5:1, although other ratios in the range of about 1.2:1 to 10:1 can be used to obtain various effects. The reaction is conveniently accomplished by heating the reactants at 80° C. for three hours and then cooling. Much longer heating or increased temperature can produce crosslinking.

Polyoxyalkylene glycols and polyols used in preparing the prepolymers have molecular weights generally ranging from about 300 to about 5000 and preferably from about 400 to 3000, more resilient polymers normally being obtainable from higher molecular weight glycols. Examples of such polyoxyalkylene glycols are polyoxyethylene glycol, polyoxypropylene glycol, polyoxytetramethylene glycol and higher polyoxyalkylene glycols. These polyether glycols are prepared by well known ring opening or condensation polymerization. When these polyols contain recurring oxyethylene groups, the total weight fraction of such oxyethylene groups should be controlled since this structure tends to confer water sensitivity to the finished product. Other suitable polyols include castor oil, hydroxyl terminated polybutadiene and hydroxyl terminated vinyl polymers, preferably in the 500–5000 molecular weight range. Polyoxyalkylene diamines, dimercaptans and other compounds having 2 or more active hydrogens, can also be used to prepare useful prepolymers, e.g. isocyanate-terminated polyether-urea prepolymers.

Polyester glycols or polyols may be used alone or in combination with polyether polyols in the preparation of the polymers for use in this invention. Polyester glycols or polyols may be prepared for example by reacting dicarboxylic acids, esters or acid halides with simple glycols or polyols. Suitable glycols are polymethylene glycols, such as ethylene, diethylene, propylene, dipropylene, tetramethylene, decamethylene glycols, substituted polymethylene glycols, such as 2,2-dimethyl-1,3-propane diol, and cyclic glycols, such as cyclohexanediol. Polyols such as glycerine, pentaerythritol, trimethylol propane and trimethylol ethane, may be used in limited amounts to introduce chain branching into the polyester. These hydroxy compounds are reacted with aliphatic, cycloaliphatic or aromatic dicarboxylic acids or lower alkyl esters or ester forming derivatives thereof to produce polymers bearing terminal hydroxyl groups, having melting points less than about 70° C., and characterized by molecular weights in the same approximate range as for the aforementioned polyoxyalkylene glycols; preferably the molecular weights are from about 400 to about 4000, and more preferably from about 1000 to about 2000. Examples of suitable acids are, for example, succinic, adipic, suberic, sebacic, phthalic, isophthalic, terephthalic and hexahydro terephthalic acids and the alkyl and halogen substituted derivatives of these acids.

The formation of a prepolymer can be carried out with or without solvents, although the presence of solvent may often facilitate mixing and handling. Common solvents which are inert to isocyanates may be used, such as toluene, xylene, etc.

Various organic polyisocyanates, preferably aromatic polyisocyanates, can be used in the preparation of latices and/or prepolymers for use in the invention. Because of their ready availability and the fact that they are liquid at room temperature, mixtures of the 2,4- and 2,6-toluene diisocyanate isomers are preferred. Other preferred diisocyanates are 4,4'-diphenylene methane diisocyanate, and 3,3'-dimethyl 4,4'-diphenyl diisocyanate. Further examples of useful aromatic diisocyanates include paraphenylene diisocyanate, meta-phenylene diisocyanate, 4,4'-diphenyl diisocyanate, 1,5-naphthalene diisocyanate, 4,4'-diphenyl ether diisocyanate, 3,3-dimethoxy 4,4'-diphenyl diisocyanate, xylylene diisocyanate, and 4-chloro-1,3-phenylene diisocyanate.

If desired, limited amounts of polyfunctional material may be mixed with the glycol or isocyanate to produce cross-linked polymers. Such crosslinks in the amount of about one crosslink or less per 50,000 polymer atomic weight units have only a very slight effect on the polymer properties. More than about one crosslink per 3000 atomic weight units makes it difficult to retain good film forming characteristics. Crosslinking reduces the thermoplasticity and the percent elongation of the polymer and also tends to increase the modulus slightly if the polyfunctional crosslinking material is a small molecule.

Small difunctional molecules, such as diethylene glycol or diamines, may be used as chain extending agents to increase the density of polar sites in the finished polymer and thereby increase such physical properties as the modulus and tensile strength. Correspondingly the prepolymer may be partially reacted with other glycols or other difunctional or trifunctional materials in such amount that the finished reaction product still retains isocyanate termination. An extensive description of these prepolymers exists in Berger et al. U.S. Pat. No. 3,178,310, issued Apr. 13, 1965.

The prepolymer may be used directly or it may be diluted with small amounts of an inert solvent such as toluene for the sulfonation step. One-tenth to 2% of sulfuric acid by *weight* is added, and the mixture is heated at 75° C. for about 30 minutes. It is then cooled to room temperature and a molar equivalent (to the $H_2SO_4$) of a base such as triethylamine is added to the partially sulfonated prepolymer to neutralize the sulfonic acid groups. This sulfonated prepolymer has a fair shelf life and does not need to be used immediately. It can be stored for several days before being used to make a stable anionic latex having the same physical properties as a latex made from fresh material.

To sum up, this invention provides for modifying an aromatic polyisocyanate (such as one or more of the diisocyanates described previously or an isocyanate-terminated prepolymer derived from such diisocyanates and one of the previously mentioned polyols) with a strong sulfonating agent, e.g. $H_2SO_4$, $SO_3$, or $Cl\text{-}SO_3H$. After neutralization of the modified polyisocyanate with a base (such as an alkali metal hydroxide, a tertiary amine, or a basic salt), the resulting product contains sulfonic acid salt groups and is capable of self-emulsification in water and is also capable of chain extension. More particularly, this invention involves reacting one of the aromatic polyisocyanates referred to previously having a molecular weight of at least 160 or one of the previously mentioned prepolymers, which can have a molecular weight up to 25,000, with a minor amount of a previously mentioned sulfonating agent to yield an aromatic polyisocyanate composition containing a minor amount (less than .5 and preferably more than .02 moles per mole of unreacted polyisocyanate) of the compound (1) 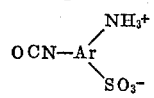

wherein Ar is an aromatic nucleus, e.g. a benzene, diphenyl, diphenyl-methane, naphthalene, or diphenyl ether nucleus. Examples of benzene-type nuclei are toluene, xylene, and chloro-benzene. Examples of diphenyl nuclei are 3,3'-dimethyl diphenyl, 4,4'-diphenylene, and 3,3'-dimethoxy diphenyl. Or, in the event that the aromatic polyisocyanate is an isocyanate-terminated prepolymer, the compound (2) 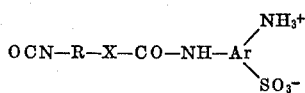

wherein Ar is as previously defined, and R represents a prepolymer chain; X is O, S, NH, or N-alkyl.

It will be apparent to those skilled in this art that the stereochemical relationship of the substituents bonded to the "Ar" (aromatic nucleus) group can be varied and that "Ar" can be a structure comprising one, two or more aromatic rings which can be separate or fused. For example, any toluene nucleus can be used, including 2,3-, 3,4-, 2,5-, and 2,6-substituted toluene. Similarly, both m- and p-phenylene are operative.

Compound (1), a monomer, can be converted to an isocyanate-terminated prepolymer similar to Compound (2) by reacting this monomer with one of the previously mentioned polyols, and both Compound (1) or Compound (2) can be neutralized with one of the aforementioned bases, and thus caused to react with a second aromatic polyisocyanate to yield, in the case of Compound (1), (3)  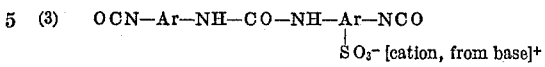

wherein Ar is as previously defined, or, in the case of Compound (2)

(4)
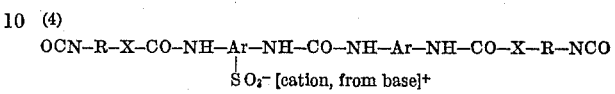

wherein Ar and R are as previously defined, as is X.

Compounds (3) and (4) are capable of chain extension, but the preferred practice of this invention is to chain-extend isocyanate-terminated prepolymers similar in structure to Compound (4).

Compounds (1) and (2), then, are sulfonated but non-neutralized, and can be represented by the structural formula (A)

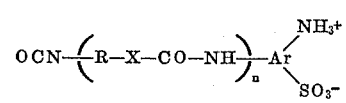

wherein R, Ar, and X are as previously defined, and $n$ is 0 or 1. When $n=0$, the structure is monomeric, and when $n=1$, the structure contains a prepolymer chain.

Compounds (3) and (4) have been at least partially neutralized and can be represented by the formula (B)

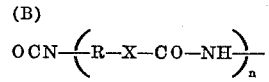

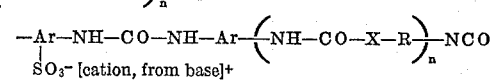

wherein R, Ar, X, and $n$ are as previously defined. Chain extension of compounds of formula (B) produces polyurethanes (as herein defined), polyureas, or the di-mercapto equivalent of a polyurethane. For the sake of convenience, the terms "polyurethane" and "polyurea" have been used to designate polymers of this invention which include at least a minor amount (the amount being determined by the amount of sulfonating agent used in the process of this invention) of repeating units comprising the following structure:

(C)

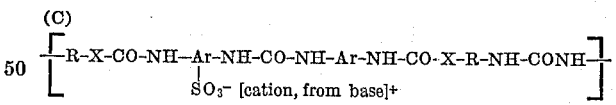

wherein Ar, R, and X are as previously defined, the other repeating units in the chain being conventional polyurethane or polyurea units.

The preferred form of R (prepolymer chain) can be represented by the structural formula

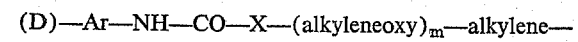

wherein Ar and X are as previously defined, and $m$ is a number selected such that the molecular weight of formula (C) will be less than 25,000.

Various bases can be used as neutralizing agents for the sulfonated polyisocyanates. Suitable examples include sodium or other alkali metal hydroxides, tertiary amines, basic salts, and the like. When the neutralizing agent is a tertiary amine, it can be added directly to the sulfonated polyisocyanate. In the case of other neutralizing agents, such as hydroxides and the like, the neutralizing agent should be stirred into the water prior to the emulsification therein of the sulfonated polyisocyanate. In any case, sufficient base is added to convert substantially all of the acid groups present in the sulfonated prepolymer to sulfonic acid salt groups.

The neutralized sulfonated prepolymer solution is stirred into water at room temperature with very vigorous agitation. Any high shear homogenizer is suitable to provide the desired degree of agitation. When smaller amounts of sulfuric acid are used to sulfonate the prepolymer, more energy is required to make good dispersion in water. Latex particles of one micron or smaller are readily obtained by this procedure. With less agitation large particle sized latices or dispersions can be prepared. Usually the amount of water used will be sufficient to provide a dispersion containing 10 to 70% by weight solids, 25 to 50 percent being preferred.

If desired, some diamine, up to almost one amino group per isocyanate group present, may be added to the water soon after the prepolymer is emulsified to cause chain extension of the prepolymer. Such a diamine will react with the isocyanate groups more readily than does water and produce a polymer having higher tensile strength and higher modulus than is produced by simple water extension. Typical examples of diamines which may be used are phenylene diamine, tolylene diamine, ethylene diamine, propylene diamine, hydrazine, piperazine, dimethyl piperazine, methylene bis-3-chloro-4-aniline, polyoxyalkylene diamines or the like. If desired a small amount of triamine or polyamine can be included in the water to yield crosslinked polymers.

If this chain extension reaction is by water, there will be considerable evolution of $CO_2$ from the reaction mixture causing considerable foaming. The chain extension reaction is exothermic and thus the temperature of the reaction mixture rises slightly. The major part of the reaction will be over within an hour, but experience has shown that the chain termination reaction is generally not complete in less than about 24 hours. Chain extension by either water or a polyamine introduces polyurea links into the polymer chain, thus producing polyurethane-polyurea latices. Such latices are commonly referred to, however, as "polyurethane latices," and thus the terms are used interchangeably herein.

In the range of 0.1 to 2.0% by weight sulfonating agent, latices can be obtained from all levels, but more energy is required to emulsify the ones made with the lower amounts of sulfonating agent. There is also more precoagulum in these cases. With the higher acid levels it is easier to make good films from the resulting latex. Sulfonated and unsulfonated prepolymers may be blended and used to obtain latices which are similar to those obtained from sulfonated prepolymers of the same average acid content.

The latices of this invention may be used for the impregnation of cloth and textiles. They may also be used as coatings on a variety of flexible substrates including cloth, paper, wood, and leather. They may be used in beater treating processes to produce reinforced papers, synthetic sheetings and the like, and are also useful in the preparation of adhesives.

The prepolymers before chain extending, or the emulsions before use, can be modified with other ingredients such as surfactants, plasticizers, dyes, pigments, minor amounts of other compatible polymers, or agents which provide light, heat, or oxidative stability, and the like.

The invention will be further illustrated with reference to the following examples in which all parts are given by weight, unless otherwise indicated.

EXAMPLE 1

A polyether polyurethane prepolymer was prepared by reacting 28.3 moles of a 778 molecular weight polyoxypropylene glycol (Wyandotte P 710) and 5.23 moles of diethylene glycol with 53.7 moles of toluene diisocyanate (80/20 mixture, by weight, of 2,4-/2,6-isomers) to an isocyanate equivalent weight of 783.

3260 parts of this prepolymer were diluted to 75% solids with 1090 parts of toluene. 36.6 parts of 98 wt. percent sulfuric acid were added dropwise over a period of 5 minutes at 35° C. An exotherm of approximately 4° C. was noted (35°–39° C.) during the sulfuric acid addition along with gas liberation. The mixture was then heated to 75° C. and held there for 30 minutes during which time the prepolymer turned somewhat brown and the gas evolution stopped. The mixture was then cooled to 40° C., and 37 grams of triethylamine was added. The prepolymer became lighter in color after this addition.

The prepolymer was then poured into 4900 parts of deionized water agitated with a ½ H.P. (373 watt) high shear homogenizer at maximum speed for 3 minutes. After the latex had stood for 3 days at room temperature the toluene was removed by azeotropic distillation. A film was prepared which was found to have the following properties: Ultimate tensile strength, 1840 lbs./in.$^2$ (129 kg./cm.$^2$); modulus at 100% elongation of 350 lbs./in.$^2$ (25 kg./cm.$^2$); elongation at break, 900%. The film was very clear and almost colorless and had a glass transition temperature ($T_g$) of −2° C. and a density (dry film) of 1.1 g./cm.$^3$.

Observation of the latex under a microscope indicated that substantially all of the particles were in the 1–3 micron range. The latex had a pH of 5.8. The percent acid, calculated as sulfuric acid, was analyzed pontentiometrically and was found to be less than 0.02 wt. percent.

EXAMPLE 2

A diisocyanate sulfonic acid reaction product was prepared by treating 348 g. of toluene diisocyanate (80/20 mixture, by weight, of 2,4-/2,6-isomers) with 40 grams of stabilized $SO_3$ (Sulfan Allied Chemicals) under anhydrous conditions. A crystalline precipitate was formed. It was isolated by filtration, washed with anhydrous toluene, and then dried in a vaccum. The dried crystals were found to be soluble in ketones and reacted vigorously with water.

A polyether-polyurethane prepolymer was made from the above by dissolving 7.80 grams of it in 100 grams of dry acetone. One hundred grams (0.10 mole) of 1000 molecular weight polyoxyalkylene diol (PPG 1025) was added along with 3 grams of triethylamine. The reaction mixture was heated to the reflux temperature (60° C.) and held there for 15 minutes, at which time 31.3 grams (0.18 moles) of toluene diisocyanate (80/20 mixture, by weight, of 2,4-/2,6-isomers) was added. The mixture was again heated to the acetone reflux temperature (60° C.) and held for 70 minutes. The reactants were then cooled and allowed to stand for 44 hours. Fifty ml. of dry toluene was added an the batch again heated to its reflux temperature (61° C.) and held there for 3 hours, followed by cooling and emulsifying in 500 grams of water with a ¼ H.P. (187 watt) Eppenbach Homomixer (Model L-1) for 3 minutes at maximum speed. The freshly prepared latex was allowed to stand for several days. A small portion was diluted to approximately 1 wt. percent solids for microscopic examination. The particle size was found to be from <1 micron to 5 microns, the latex being free of particles larger than 5 microns.

A small portion was poured into a petri dish and allowed to air dry at room temperature.

A very clear and colorless film resulted. Physical data of film:

Tensile strength: 950 p.s.i. (67 kg./cm.$^2$)
100% modulus: 180 p.s.i. (12.7 kg./cm.$^2$)
Percent elongation at break: 490%.

EXAMPLE 3

A polyether-polyurethane prepolymer was prepared from 6.1 moles of polyoxypropylene glycol (molecular weight 1970), 1.55 moles of triol (molecular weight 424) and 16.43 moles of toluene diisocyanate. The reaction was carried out at 85° C. for six hours to an isocyanate equivalent of 988.

Four portions of it were treated at 75% solids with 0.25, 0.50, 1.0, and 2.0% by weight of sulfuric acid, respectively. These four different prepolymers were neutralized with their corresponding molar equivalent of triethylamine followed by emulsification in water. The properties of the latices and films formed therefrom are given in Table I.

The unemulsified prepolymers were stord and observed from time to time. The following observations were made:

TABLE I

| Weight percent H₂SO₄ added to prepolymer | Prepolymer viscosity after 24 hours, centipoise | Latex solids after toluene removal, weight percent | Particle size of latex, microns | Tensile of film, lb./in.² (kg./cm.²) | Film properties |
|---|---|---|---|---|---|
| 0.25 | 348 | 42.0 | Majority <5, some 6-20 | | Cracked ½ in. (1-2 cm.) pieces. |
| 0.50 | 536 | 40.5 | Majority <4, some 4-15 | | Do. |
| 1.0 | 2,450 | 41.3 | ___do___ | 1,080 (76) | Few cracks. |
| 2.0 | 100,000 | 37.7 | Majority <6, some 7-200 | 1,420 (100) | Perfect film. |

Thus, with the particular system, in order to produce a latex with small uniform particles 0.50%–1.0% (by weight) sulfonation is preferred. On the other hand, to insure good film formation, 1.0%–2.0% (by weight) sulfonation is preferred. At the different levels of H₂SO₄ treatment there was no visible difference in film color or clarity.

EXAMPLE 4

A polyether-polyurethane prepolymer was prepared as in Example 3. A portion of it was treated with 1 wt. percent sulfuric acid and the batch heated to 75° C. at which point three samples were removed and neutralized with different molar ratios of triethylamine followed by emulsification in water. This step was repeated again after the reactants had been at 75° C. for 30 minutes, and again after it had been at 75° C. for 90 minutes.

Initial charge:
 3000 g. prepolymer (NCO equivalent weight=1013)
 1000 g. dry toluene
 31.3 g. 96.0 wt. percent H₂SO₄.

The following samples were prepared by neutralizing the reactants when they reached 75° C. and then emulsifying in water:

| Sample designation | Parts (C₂H₅)₃N per 3,000 parts prepolymer | Molar ratio, (C₂H₅)₃N/—SO₃H | Parts water |
|---|---|---|---|
| 1a | 17.4 | 0.73/1 | 4,070 |
| 1b | 29.0 | 1.25/1 | 4,070 |
| 1c | 23.2 | 1/1 | 4,070 |
| 1d | 23.2 | 1/1 | Saved. |

After reactants had been at 75° C. for 30 minutes, the following samples were removed, neutralized and emulsified in water:

| Sample designation | Parts (C₂H₅)₃N per 3,000 parts prepolymer | Molar ratio, (C₂H₅)₃N/—SO₃H | Parts water |
|---|---|---|---|
| 2a | 17.4 | 0.75/1 | 4,070 |
| 2b | 29.0 | 1.23/1 | 4,070 |
| 2c | 23.2 | 1/1 | 4,070 |
| 2d | 23.2 | 1/1 | Saved. |

After reactants had been at 75° C. for 90 minutes, the following samples were removed, neutralized and emulsified in water:

| Sample designation | Parts (C₂H₅)₃N per 3,000 parts prepolymer | Molar ratio, (C₂H₅)₃N/—SO₃H | Parts water |
|---|---|---|---|
| 3a | 17.4 | 0.75/1 | 4,070 |
| 3b | 29.0 | 1.25/1 | 4,070 |
| 3c | 23.2 | 1/1 | 4,070 |
| 3d | 23.2 | 1/1 | Saved. |
| 3e | 17.4 | 0.75/1 | Do. |
| 3f | 29.0 | 1.25/1 | Do. |

| Sample | Initial viscosity, centipoise | Viscosity after 18 days, centipoise | Initial —NCO number | NCO number after 18 days |
|---|---|---|---|---|
| 1d | 1,770 | 1,950 | 1,280 | 1,375 |
| 2d | 2,160 | 2,140 | 1,297 | 1,381 |
| 3d | 2,120 | 2,270 | 1,302 | 1,379 |
| 3e | 2,010 | 2,320 | | |
| 3f | 2,120 | 4,800 | | |

Films were cast and dried at 21° C. and 50% relative humidity, further dried at 65° C. for 16 hours, heat cured at 150° C. for 15 minutes, and then held at 21° C., 50% relative humidity, for at least 24 hours. The films were then tested and found to have the following properties:

| Sample | Tensile strength lb./in.² (kg./cm.²) | Modulus at 100% elongation, p.s.i. (kg./cm.²) | Percent elongation at rupture |
|---|---|---|---|
| 1a | 550 (39) | 93 (6.5) | 760 |
| 1b | 870 (61) | 150 (10.5) | 670 |
| 1c | 1,070 (75) | 140 (9.9) | 780 |
| 2a | 430 (30) | 100 (7) | 620 |
| 2b | 1,000 (70) | 140 (9.9) | 760 |
| 2c | 960 (68) | 140 (9.9) | 730 |
| 3a | 440 (31) | 100 (7) | 630 |
| 3b | 910 (64) | 140 (9.9) | 790 |
| 3c | 1,040 (73) | 140 (9.9) | 820 |

EXAMPLE 5

A polyether-polyurethane prepolymer was prepared by reacting one mole 2000 average molecular weight polyoxypropylene glycol and 0.262 moles 426 average molecular weight polyoxypropylene triol with 2.82 moles toluene diisocyanate (80/20 mixture, by weight, of 2,4-/2,6-isomers) at 85° C. to an NCO equivalent weight of 928. This was diluted to 75.0 wt. percent solids with dry toluene and reacted with 1.00 wt. percent sulfuric acid and neutralized with its molar equivalent of triethylamine. 400 grams of the above prepolymer were emulsified in 500 grams of water by stirring at maximum speed with a ¼ horsepower (187 watt) Eppenbach Homo-mixer for three minutes, at which time 3.71 grams 64 wt. percent hydrazine was added and emulsification continued for another 15 seconds. The freshly prepared latex was allowed to stand for several days. A film was prepared by allowing a portion of the latex to dry at room temperature followed by a fusion cycle at 150° C. for 10 minutes and then held at 50% relative humidity and 21° C. The film had the following properties:

Tensile strength: 1110 lb./in.² (78 kg./cm.²)
100% modulus: 160 lb./in.² (11 kg./cm.²)
Elongation: 660%.

EXAMPLE 6

A polyether-polyurethane was prepared by reacting ½ mole of 1000 average molecular weight polyoxypropylene glycol with 1 mole of diphenylmethane diisocyanate at 85° C. for 3.5 hours. To reduce the viscosity somewhat 87 g. of toluene were added. To this 7.77 g. 96 wt. percent sulfuric acid were added over a period of one hour at 85° C. followed by the addition of 9.48 g. of triethylamine. This is a 1.25/1 molar ratio of $(C_2H_5)_3N/H_2SO_4$. 107 grams of toluene were added to 226 g. of the above prepolymer (60 wt. percent solids) and the solution was then emulsified in 500 g. of water at maximum speed with a ¼ horsepower (187 watt) Eppenbach Homo-mixer for 1.5 minutes and then allowed to stand for several days. A portion of this was dried in a level petri dish and fused at 65° C. for 16 hours, followed by reconditioning at 50% relative humidity and 21° C. for 24 hours. It had the following properties:

Tensile strength: 1360 lb./in.$^2$ (96 kg./cm.$^2$)
100% modulus: 250 lb./in.$^2$ (17.6 kg./cm.$^2$)
Elongation at break: 1000%.

EXAMPLE 7

A hydroxy terminated polyester having a theoretical molecular weight of 1036 was prepared by reacting 6 moles of adipic acid with 6.3 moles of ethylene glycol and 0.7 moles of propylene glycol in the presence of 0.05 wt. percent $ZnCl_2$ catalyst at 150° C. to 200° C. over a period of 10 hours.

A prepolymer was then formed by reaction of 2 moles of toluene diisocyanate (80/20 mixture, by weight, of 2,4-/2,6-isomers) with the polyester after it had cooled to room temperature. 245 grams of the prepolymer were thinned to 60 wt. percent solids with 164 g. toluene. The reactants were heated to 50° C. with 2.56 g. of 96 wt. percent sulfuric acid were added and the temperature increased to 75° C. for 40 minutes. At this point 2.52 g. triethylamine was added. The prepolymer was allowed to cool to 65° C. and emulsified in 400 g. of water to form a stable non-film forming latex.

EXAMPLE 8

A polyether-polyurethane prepolymer was prepared by reacting 385 parts 2000 average molecular weight polyoxypropylene glycol and 21.3 parts of 425 average molecular weight polyoxypropylene triol with 92.3 parts of toluene diisocyanate (80/20 mixture, by weight, of 2,4-/2,6-isomers) at 88° C. to an isocyanate equivalent weight of 930. 3000 parts of the prepolymer were diluted to 75 wt. percent solids with dry toluene, heated with mixing to 48° C. At this point 31.9 parts of 95.9 wt. percent $H_2SO_4$ was added. The mixture was then heated to 75° C. for 30 minutes after which it was allowed to cool with stirring to room temperature overnight.

To 400 parts of the sulfonated prepolymer, 2.40 parts of pyridine were added and stirred in. This was then mixed for 1 hour, followed by emulsification in 450 parts of room temperature, deionized water. A stable latex was produced. A film formed therefrom had a tensile strength of 560 lbs./in.$^2$ (39.4 kg./cm.$^2$), a modulus at 100% elongation of 120 lbs./in.$^2$ (8.4 kg./cm.$^2$) and an elongation at rupture of 620%.

Another latex was prepared from the above sulfonated prepolymer by first dissolving 4.3 parts of $Na_2HPO_4$ in 450 parts of deionized water. 400 parts of the un-neutralized sulfonated prepolymer were emulsified therein to form a stable latex. A film formed therefrom had a tensile strength of 660 p.s.i. (46.5 kg./cm.$^2$), a modulus at 100% elongation of 160 p.s.i. (11 kg./cm.$^2$) and an elongation at rupture of 570%.

Still another latex was produced, wherein NaOH was used as the neutralizing agent. It was prepared in the same manner except that 12.1 parts of 10 wt. percent aqueous NaOH was used in place of the $Na_2HPO_4$. This also produced a stable latex. A film formed therefrom had a tensile strength of 940 p.s.i. (66 kg./cm.$^2$), a modulus at 100% elongation of 170 p.s.i. (12 kg./cm.$^2$), and an elongation at rupture of 650%.

EXAMPLE 9

A polyether-polyurethane prepolymer was prepared as in Example 8 and left unsulfonated. 200 parts were diluted with 67 parts of dry toluene. 6 parts of the diisocyanate sulfonic acid described in Example 2 were dissolved in 50 parts of dry acetone and mixed into the above diluted prepolymer. To this were added 5 parts of triethylamine. This mixture was then emulsified in 300 parts of room temperature deionized water. Considerable foaming occurred, apparently because of a rapid rate of $CO_2$ evolution. A stable latex was produced, but precoagulum was also noted to be present.

EXAMPLE 10

104.2 parts of toluene diisocyanate (80/20 mixture, by weight, of 2,4-/2,6-isomers) was mixed with 50 parts of anhydrous acetone. To this 4.22 parts of 95.9 wt. percent $H_2SO_4$ were added dropwise. An 18° exotherm was noted (25–43° C.) during which time the reactants became turbid, followed by the formation of a precipitate. The ingredients were heated to the reflux temperature (65° C.) and held there for 30 minutes after which time the precipitate went into solution, and the color changed from pale yellow to a very dark red. To this was added 4.14 parts of $(C_2H_5)_3N$ which caused the color to revert back to its pale yellow. This was followed by the addition of 300 parts of a 1002 average molecular weight polyoxypropylene glycol. This caused a turbid solution to be formed. The reactants were then heated to 80° C. and held there for 2 hours, after which larger pieces of insoluble matter had formed. The prepolymer was then emulsified in approximately 800 parts of room temperature deionized water with an Eppenbach (Model L–1) Homo-mixer at maximum speed for 3 minutes. The freshly prepared latex was allowed to stand for two weeks, during which time it remained stable.

EXAMPLE 11

A polyether-urethane prepolymer was prepared by reacting 3000 grams of a 1002 average molecular weight polyoxypropylene glycol with 1042 grams of toluene diisocyanate (80/20 mixture, by weight, of 2,4-/2,6-isomers) at 65° C. for 4 hours. After the prepolymer had aged for 7 days, 300 grams of it was diluted to 50 wt. percent solids with 300 grams of 1,1,1-trichloroethane. The dilute prepolymer was adjusted to 25° C. and then 1.27 ml. of stabilized $SO_3$ was pipetted in dropwise. Almost no color change was noted with very little charring. This was stirred for 30 minutes at 25° C. at which time 3.09 grams of $(C_2H_5)_3N$ was added and stirring continued for another 30 minutes. At the end of this time the dilute sulfonated prepolymer was emulsified in 1500 grams of water in a high shear mixer. The freshly prepared latex was allowed to stand several weeks during which time it remained stable.

EXAMPLE 12

A polyether-urethane prepolymer was prepared by reacting 3000 grams of a 1002 average molecular weight polyoxypropylene glycol with 1042 grams of toluene diisocyanate (80/20 mixture, by weight, of 2,4-/2,6-isomers) at 65° C. for 4 hours. After the prepolymer had aged 10 days, 300 grams of it was diluted with 200 grams of dry toluene. Six grams of methyl diethanolamine premixed with 100 grams of toluene and then added to the above dilute prepolymer and allowed to react at 60° C. for 75 minutes. At this point 8.29 grams of 95.9% $H_2SO_4$ was added dropwise and allowed to react at 75° C. for 70 minutes. To this was added 8.19 grams of triethylamine which was stirred in, followed by emulsification in 900 grams of water to form a stable latex. An electrophoretic separation was run to determine the ionic character of the latex. The procedure involved dilution of some of the latex to about 1 wt. percent solids and insertion therein of two nickel electrodes connected to a 30 volt D.C. power source. It was discovered that the water became clear in the vicinity of the anode, and the latex particles were attracted to and coated out on the cathode, thus indicating that the latex was anionic in character.

EXAMPLE 13

A polyether-urethane prepolymer was prepared by reacting 2.0 moles of a 1060 average molecular weight polyoxytetramethylene glycol and 0.10 moles of a 423 average molecular weight polypropylene ether triol with 4.3 moles of toluene diisocyanate (80/20 mixture, by weight, of 2,4-/2,6-isomers) at 82° C. for four hours. The prepolymer was diluted to 75% solids with dry toluene followed by cooling to 65° C. and the addition of 58.2 grams of 96% $H_2SO_4$, which was allowed to react at 65–70° C. for 45 minutes. At the end of this time it was noticed that the prepolymer became very viscous. Sixty grams of $(C_2H_5)_3N$ was then added and stirred in. At this point it was noticed that the viscosity decreased by a considerable amount. The batch was then mixed for 5 minutes followed by emulsification in 5400 grams of room temperature deionized water. The freshly prepared latex was allowed to stand for 48 hours after which the toluene was azeotroped out under vacuum.

A film was prepared as in Example 4. Film properties:

Tensile strength: 1590 p.s.i. (112 kg./cm.$^2$)
Modulus at 100%: 260 p.s.i. (18 kg./cm.$^2$)
Elongation at break: 830%.

EXAMPLE 14

A polyether-urethane prepolymer was prepared by reacting 363 grams of a 976 average molecular weight polyoxypropylene glycol with 137 grams of xylylene diisocyanate at 85° C. for 5 hours. 250 grams of 1,1,1-trichloroethane was added to reduce the viscosity and cool the batch to 65° C. At this point 2.12 ml. of $SO_3$ was added after which dark brown pieces of insoluble matter formed. This was followed by the addition of 250 grams of toluene and stirring at 65° C. for 15 minutes. Next, 5.2 grams of triethylamine was added and allowed to stir in at 85° C. for one hour, followed by emulsification in 1500 grams of water. The prepolymer emulsified easily, and the latex was found to be stable for at least two days.

EXAMPLE 15

A polyether-urethane prepolymer was prepared by reacting 311 grams of a 976 average molecular weight polyoxypropylene glycol with 189 grams of dianisidine diisocyanate at 75–85° C. for 25 hours. The prepolymer was then allowed to stand and cool for another 20 hours. It was then diluted with 250 grams of toluene to reduce the viscosity and heated to 50° C. followed by the addition of 5.23 grams of 95.9% $H_2SO_4$. The reactants were further heated to 75° C. and held there for 30 minutes followed by cooling to 50° C. To this was added 5.15 grams of triethylamine which was allowed to stir in for one hour. The prepolymer was then emulsified in 1130 grams of water to form a stable latex. A film formed therefrom was found to have a tensile strength of 2100 p.s.i. (148 kg./cm.$^2$), a modulus at 100% elongation of 280 p.s.i. (20 kg./cm$^2$) and an elongation at rupture of 440%

EXAMPLE 16

A polyether-urethane prepolymer was prepared by reacting 368 grams of a 976 average molecular weight polyoxypropylene glycol with 131 grams of toluene diisocyanate (80/20 mixture of 2,4-/2,6-isomers) at 75–90° C. for 4 hours. To this was added 250 grams of toluene, and the batch cooled to 20° C. At this point 3.33 ml. of $ClSO_3H$ was added, followed by heating to 105° C. The toluene was then stripped off under vacuum while allowing the prepolymer to cool to 50° C. 5.2 grams of triethylamine was then added and stirred in for 40 minutes, followed by emulsification in 750 grams of $H_2O$, to form a stable latex. A film formed therefrom was found to have a tensile strength of 1320 p.s.i. (93 kg./cm.$^2$), a modulus at 100% elongation of 280 p.s.i. (20 kg./cm.$^2$), and an elongation at rupture or 860%.

The polyurethane (including polyurethane-polyurea) and polyurea latices of this invention, have many uses, e.g. as coating, impregnating, or film-forming compositions. They are particularly useful in the art of making adhesives, textile printing pastes, ink pads, plastic bandage materials, filters, bearings, leather substitutes, battery separators, or fabrics. Thus, the latices of this invention can be used alone or in combination with particulate fillers such as natural and/or synthetic fibers to form water-laid sheets which can be heated and/or pressed to make rubbery, leather-like, or inflexible, board-like materials of varying degrees or porosity, water absorptivity, and/or ion-transfer characteristics. Another type of fabric, filter layer, leather substitute or battery separator is made by inpregnating a woven fabric or non-woven batt or web with the latex. Still other types of fabric, leather substitutes, filters, etc. can be made by coating the latex (or bonding a preformed film derived from the latex) onto an appropriate substrate. All of these techniques are well known in the art; see, for example, U.S. Pats. 2,112,529 (Hazell), issued Mar. 29, 1938; 2,719,806 (Nottebohm), issued Oct. 4, 1955; 2,723,935 (Rodman), issued Nov. 15, 1955; 2,780,562 (Reinartz et al.), issued Feb. 5, 1957; 3,436,303 (Raymond et al.), issued Apr. 1, 1969; and 3,445,272 (Newton), issued May 20, 1969. Leather substitutes made according to these techniques can be made sufficiently scuff resistant, flex-fatigue resistant, and/or microporous to be used as shoe sole or upper materials.

What is claimed is:

1. A self-emulsified polyurethane polymer containing repeating units having the following structural formula:

$$-NH-CO-NH-R-X-CO-NH$$
$$\quad\quad\quad\quad\quad\quad\quad\quad\quad\quad\quad | $$
$$\quad\quad\quad\quad\quad\quad\quad\quad\quad\quad\quad Ar$$
$$\quad\quad\quad\quad\quad\quad\quad\quad\quad\quad\quad |$$
$$-R-X-CO-NH-Ar-NH-CO-NH$$
$$\quad\quad\quad\quad\quad\quad\quad\quad\quad\quad\quad\quad\quad\quad\quad\quad |$$
$$\quad\quad\quad\quad\quad\quad\quad\quad\quad\quad\quad\quad\quad\quad\quad\quad SO_3^-\text{(cation)}^+$$

wherein

Ar is an aromatic nucleus;

R is a prepolymer chain containing a polyester or polyoxyalkylene chain, R being selected such as that each of said repeating units has a molecular weight less than 25,000; and X is an element of Group VI-A of the Periodic Table having an atomic number no larger than 16.

2. A polymer according to claim 1 wherein said atomic number is 8.

3. A polymer according to claim 2 wherein said molecular weight is in the range of 720 to 10,000.

4. A polymer according to claim 2 wherein R contains the residue of a polyol, said polyol having a molecular weight of about 300 to about 5000.

5. A polymer according to claim 2 wherein said cation is an alkali metal cation.

6. A polymer according to claim 2 wherein said cation is a tertiary ammonium cation.

7. A polymer according to claim 1 wherein X is oxygen and R has the structural formula $$-Ar-NH-CO-R'-$$

wherein R' is a chain of repeating units having a molecular weight of about 300 to about 5000.

8. A polymer according to claim 7 wherein R' is a chain of repeating oxyalkylene units.

9. A self-emulsified polyurethane polymer containing repeating units having the following structural formula:

$$-NH-CO-NH-Ar-NH-CO-(OR'')_m-O-CO-NH$$
$$\quad\quad\quad\quad\quad\quad\quad\quad\quad\quad\quad\quad\quad\quad\quad\quad\quad\quad\quad |$$
$$\quad\quad\quad\quad\quad\quad\quad\quad\quad\quad\quad\quad\quad\quad\quad\quad\quad\quad\quad Ar$$
$$\quad\quad\quad\quad\quad\quad\quad\quad\quad\quad\quad\quad\quad\quad\quad\quad\quad\quad\quad |$$
$$-Ar-NH-CO-(OR'')_m-O-CO-NH-Ar-NH-CO-NH$$
$$\quad\quad\quad\quad\quad\quad\quad\quad\quad\quad\quad\quad\quad\quad\quad\quad\quad\quad\quad\quad\quad\quad\quad\quad\quad\quad |$$
$$\quad\quad\quad\quad\quad\quad\quad\quad\quad\quad\quad\quad\quad\quad\quad\quad\quad\quad\quad\quad\quad\quad\quad\quad\quad\quad SO_3^-\text{(cation)}^+$$

wherein

Ar is an aromatic nucleus;

R" is an alkylene radical; and $m$ is a number selected such that molecular weight of each of said repeating units is in the range of 720 to 10,000.

10. A polymer according to claim 9 wherein said cation is an alkali metal cation.

11. A method of making a sulfonated polyurethane polymer comprising the steps of
(a) providing a mixture comprising aromatic isocyanate-terminated polyurethane compounds having a molecular weight less than 25,000 and sulfonating agent selected from the group consisting of $H_2SO_4$, $SO_3$, $ClSO_3H$, and mixtures thereof, the number of moles of said sulfonating agent being less than the number of moles of said polyurethane compounds, and the ratio of the number of moles of said sulfonating agent to the numerical difference between the moles of said isocyanate-terminated polyurethane compounds and the moles of said sulfonating agent being 0.02:1 to 0.5:1;
(b) heating said mixture to a temperature sufficient to cause sulfonation of said aromatic isocyanate-terminated polyurethane compounds;
(c) neutralizing the resulting sulfonated product with a base to provide the salt form of said sulfonated product;
(d) chain extending the neutralized, sulfonated product in water in the presence of a chain extending agent selected from the group consisting of water and diamine, said diamine being present in an amount to provide up to one amino group per isocyanate group present in said product.

References Cited

UNITED STATES PATENTS

| | | | |
|---|---|---|---|
| 3,479,310 | 11/1969 | Dieterich et al. | 260—29.2 TN |
| 3,491,050 | 1/1970 | Keberle et al. | 260—29.2 TN |
| 3,617,352 | 11/1971 | Shima et al. | 260—29.2 TN |
| 3,395,129 | 7/1968 | Dieterich et al. | 260—77.5 |
| 3,479,325 | 11/1969 | Blomeyer et al. | 260—77.5 |

FOREIGN PATENTS

| | | | |
|---|---|---|---|
| 1,076,688 | 7/1967 | Great Britain | 260—29.2 TN |

OTHER REFERENCES

Bieber: Jour. Am. Chem. Soc., 75, 1409–1412 (Mar. 20, 1953), "Bieber II."

Degering: Organic Chemistry, 6th ed., Barnes & Noble (New York), 1957, pp. 206–7.

Saunders et al.: Polyurethanes, part I, Interscience (New York), 1962, pp. 94–95.

HERBERT S. COCKERAM, Primary Examiner

U.S. Cl. X.R.

8—115.6; 117—161; 162—164; 260—75 NT, 75 NE, 77.5 AT